United States Patent
Frota de Souza Filho

(10) Patent No.: US 10,207,337 B2
(45) Date of Patent: Feb. 19, 2019

(54) FRONT-LOADED, SIDE-ACTIVATED MODULAR DRILL

(71) Applicant: Kennametal Inc., Latrobe, PA (US)

(72) Inventor: Ruy Frota de Souza Filho, Latrobe, PA (US)

(73) Assignee: KENNAMETAL INC., Latrobe, PA (US)

( * ) Notice: Subject to any disclaimer, the term of this patent is extended or adjusted under 35 U.S.C. 154(b) by 7 days.

(21) Appl. No.: 15/478,563

(22) Filed: Apr. 4, 2017

(65) Prior Publication Data

US 2018/0281084 A1    Oct. 4, 2018

(51) Int. Cl.
*B23B 51/02* (2006.01)

(52) U.S. Cl.
CPC .......... *B23B 51/02* (2013.01); *B23B 2251/02* (2013.01); *B23B 2251/50* (2013.01)

(58) Field of Classification Search
CPC ............ B23B 2251/50; B23B 51/0009; B23B 51/048; B23B 2251/02
See application file for complete search history.

(56) References Cited

U.S. PATENT DOCUMENTS

| | | | |
|---|---|---|---|
| 124,089 A * | 2/1872 | Shepardson | B23B 51/02 408/212 |
| 318,994 A * | 6/1885 | Lake | B23C 5/1036 408/173 |
| 2,399,939 A | 5/1946 | Phillips | |
| 2,400,856 A * | 5/1946 | Thompson | B23B 51/00 407/48 |
| 2,801,614 A | 8/1957 | Dieterich | |
| 2,847,225 A | 8/1958 | Kosinski | |
| 3,049,033 A * | 8/1962 | Benjamin | B23B 51/06 175/420.1 |
| 3,311,023 A | 3/1967 | Kaiser | |
| 3,436,990 A * | 4/1969 | Tourison | B23B 51/0009 408/56 |

(Continued)

FOREIGN PATENT DOCUMENTS

| | | |
|---|---|---|
| DE | 7043832 U | 3/1971 |
| DE | 19710996 | 12/1999 |

(Continued)

OTHER PUBLICATIONS

Feb. 6, 2018 Office action (3 months).

*Primary Examiner* — Daniel Howell
(74) *Attorney, Agent, or Firm* — Ian K. Samways

(57) ABSTRACT

A front-loaded, side-activated modular drill includes a shank and a replaceable cutting insert installed on and engaging the tool shank. The shank has a pocket for supporting the cutting insert when the cutting insert is installed within the pocket. The pocket includes a first centering wall having an aperture with internal threads formed with a first pitch and a second centering wall having an aperture with a first portion with internal threads formed with a second, different pitch. A first member is threaded into the aperture of the first centering wall, and a second member is threaded into the second centering wall. The first member is threaded into the second member. The cutting insert has an opening in a trailing end for allowing the first member to pass therethrough. Rotation of the first member causes the centering walls to elastically deform and move relative to each other.

26 Claims, 10 Drawing Sheets

(56) References Cited

U.S. PATENT DOCUMENTS

| | | | |
|---|---|---|---|
| 4,611,672 A | 9/1986 | Holzl | |
| 4,744,704 A * | 5/1988 | Galvefors | B23B 51/02 |
| | | | 408/144 |
| 4,854,789 A * | 8/1989 | Evseanko, Jr. | B25H 1/0064 |
| | | | 408/125 |
| 5,452,971 A | 9/1995 | Nevills | |
| 5,599,145 A | 2/1997 | Reinauer | |
| 5,678,645 A | 10/1997 | Tibbitts et al. | |
| 5,704,742 A | 1/1998 | Reinauer | |
| 5,820,318 A | 10/1998 | Danielsson et al. | |
| 5,904,448 A * | 5/1999 | Lee | B23C 5/1045 |
| | | | 407/34 |
| 5,957,635 A * | 9/1999 | Nuzzi | B23B 51/06 |
| | | | 408/199 |
| 5,961,259 A | 10/1999 | Ziegler | |
| 6,109,841 A | 8/2000 | Johne | |
| 6,196,769 B1 * | 3/2001 | Satran | B23B 51/00 |
| | | | 407/40 |
| 7,131,799 B2 * | 11/2006 | Stokey | B23B 51/0009 |
| | | | 408/230 |
| 7,311,480 B2 | 12/2007 | Heule et al. | |
| 7,625,161 B1 | 12/2009 | Ruy Frota de Souza | |
| 8,876,446 B2 | 11/2014 | Shaheen | |
| 8,992,143 B2 | 3/2015 | Glimpel | |
| 2002/0168239 A1 | 11/2002 | Mast | |
| 2003/0091403 A1 | 5/2003 | Lindblom | |
| 2003/0219321 A1 | 11/2003 | Borschert | |
| 2006/0051172 A1 | 3/2006 | Johnson et al. | |
| 2007/0274794 A1 | 11/2007 | Cirino | |
| 2010/0021253 A1 | 1/2010 | Frejd | |
| 2010/0104384 A1 | 4/2010 | Orlov | |
| 2010/0303561 A1 | 12/2010 | Fouquer | |
| 2011/0110735 A1 | 5/2011 | Klettenheimer et al. | |
| 2011/0114393 A1 | 5/2011 | Dolan et al. | |
| 2012/0148358 A1 | 6/2012 | Hecht | |
| 2012/0230787 A1 | 9/2012 | Harif | |
| 2013/0042462 A1 | 2/2013 | Frota de Souza Filho | |
| 2013/0259590 A1 | 10/2013 | Shaheen | |
| 2014/0353931 A1 | 12/2014 | Frota de Souza Filho | |
| 2014/0363257 A1 | 12/2014 | Parker | |
| 2015/0147128 A1 | 5/2015 | Saji | |
| 2015/0306686 A1 | 10/2015 | Mani | |
| 2015/0360300 A1 | 12/2015 | Hecht | |
| 2016/0067785 A1 | 3/2016 | Wang et al. | |
| 2016/0263664 A1 | 9/2016 | Son | |

FOREIGN PATENT DOCUMENTS

| | | | | |
|---|---|---|---|---|
| EP | 1864733 A1 * | 12/2007 | | |
| GB | 1 341 651 A | 12/1973 | | |
| JP | 2000084718 A * | 3/2000 | | |
| JP | 2004261931 A * | 9/2004 | | |
| JP | 2004306170 A * | 11/2004 | | |
| JP | 2004330390 A * | 11/2004 | | |
| JP | 2004330391 A * | 11/2004 | | |
| JP | 2006272472 A * | 10/2006 | | |
| WO | WO2006001551 | 1/2006 | | |
| WO | WO 2009050789 A1 * | 4/2009 | | B23C 5/1036 |
| WO | 2011/058532 A2 | 5/2011 | | |
| WO | WO13033740 | 3/2013 | | |

* cited by examiner

FRONT-LOADED, SIDE-ACTIVATED MODULAR DRILL

FIELD OF THE INVENTION

The present invention relates to cutting tools, and more particularly to modular drills having replaceable cutting tips.

BACKGROUND OF THE INVENTION

A great variety of drills with replaceable cutting tips (or cutting inserts) are known in the art. Such drills involve replaceable cutting inserts that are mounted on shanks. Typically, though by no means exclusively, the cutting inserts and shanks can display continuous and complementing configuration as fluted drills. Each shank will normally include a structure for retaining and rotating an associated cutting insert, while the associated cutting insert will have a complementing structure for being retained and rotated by the shank.

Often, challenges are encountered with respect to deformation and failure during the service life of a drill, due (at least in part) to a concentration of stresses imposed on the retaining and drive structure of the shank during ordinary service. Sometimes, permanent deformation may occur under high torque and the pocket loses the ability to center or hold the cutting insert mounted therein. This may unduly limit the useful service life of the drill, thus relevant improvements and modifications continue to be sought that might help mitigate the effect of known problems and constraints.

SUMMARY OF THE INVENTION

The invention solves the problem of the permanent deformation of the pocket under high torque and breakage of clamping elements by providing a side-activated modular drill with a first member, such as a clamping screw, and a second member, such as a nut, to create elastic deformation of the pocket walls when replacing and clamping the cutting insert.

In one aspect of the invention, a front-loaded, side-activated modular drill for conducting rotary cutting operations on a work piece comprising a shank and a replaceable cutting insert, the tool shank and the cutting insert having a common rotational axis and complimentary peripheral surfaces when assembled together. The shank has a pocket for supporting the cutting insert when the cutting insert is installed within the pocket. The pocket comprises a first centering wall and a second centering wall, the first centering wall having an aperture with internal threads formed with a first pitch, the second centering wall having an aperture with a first portion with internal threads formed with a second, different pitch. A first member is threaded into the aperture of the first centering wall. A second member is threaded into the aperture of the second centering wall of the shank and into the first member. A replaceable cutting insert is inserted within the pocket of the shank, the cutting insert having a leading end and a trailing end, the trailing end having an opening for allowing the first member to pass therethrough. Rotation of the first member in a first direction causes the first centering wall and the second centering wall to move radially outward with respect to the rotational axis, thereby allowing the cutting insert to be removed from the pocket of the shank. Rotation of the first member in a second direction, opposite to the first direction, causes the first centering wall and the second centering wall to move radially inward with respect to the rotational axis, thereby clamping the cutting insert securely in the pocket of the shank.

In another aspect of the invention, a front-loaded, side-activated modular drill for conducting rotary cutting operations on a work piece comprising a shank and a replaceable cutting insert, the tool shank and the cutting insert having a common rotational axis and complimentary peripheral surfaces when assembled together. The shank has a pocket for supporting the cutting insert when the cutting insert is installed within the pocket. The pocket comprises a first centering wall and a second centering wall, the first centering wall having an aperture, the second centering wall having an aperture. A second member is disposed within the first centering wall of the shank, the second member having an aperture with internal threads formed with a first pitch. A first member is inserted through the aperture of the first centering wall and threaded into the second member. A third member is disposed within the second centering wall of the shank, the third member having an aperture with internal threads formed with a second pitch. The first member is threaded into the third member and extends through the aperture of the second centering wall. A replaceable cutting insert is inserted within the pocket of the shank, the cutting insert having a leading end and a trailing end, the trailing end having an opening for allowing the first member to pass therethrough. Rotation of the first member in a first direction causes the first centering wall and the second centering wall to move radially outward with respect to the rotational axis, thereby allowing the cutting insert to be removed from the pocket of the shank. Rotation of the first member in a second direction, opposite to the first direction, causes the first centering wall and the second centering wall to move radially inward with respect to the rotational axis, thereby clamping the cutting insert securely in the pocket of the shank.

In yet another aspect of the invention, a method for conducting rotary cutting operations on a work piece utilizing a front-loaded, side-activated modular drill comprising a shank and a replaceable cutting insert, the tool shank and the cutting insert having a common rotational axis and complimentary peripheral surfaces when assembled together, the shank having a pocket for supporting the cutting insert when the cutting insert is installed within the pocket, the pocket comprising a first centering wall and a second centering wall, the first centering wall having an aperture with internal threads formed with a first pitch, the second centering wall having an aperture with a first portion with internal threads formed with a second, different pitch; a first member threaded into the aperture of the first centering wall; a second member disposed within the second centering wall of the shank, a replaceable cutting insert inserted within the pocket of the shank, the cutting insert having a leading end and a trailing end, the trailing end having an opening for allowing the first member to pass therethrough, the method comprising:

rotating a first member threaded into the aperture of the first centering wall in a first direction to cause the first centering wall and the second centering wall to move radially outward with respect to the rotational axis, thereby allowing the cutting insert to be removed from the pocket of the shank; and rotating the first member in a second direction, opposite to the first direction, to cause the first centering wall and the second centering wall to move radially inward with respect to the rotational axis, thereby clamping the cutting insert securely in the pocket of the shank.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

DETAILED DESCRIPTION OF THE INVENTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

The description now turns to the figures. The illustrated embodiments of the invention will be best understood by reference to the figures. The following description is intended only by way of example and simply illustrates certain selected exemplary embodiments of the invention as claimed herein.

Referring now to FIGS. 1-4, a rotary cutting tool 10 for conducting rotary cutting operations on a workpiece (not shown) is shown according to an embodiment of the invention. In general, the cutting tool assembly 10 includes a tool shank 12 and a replaceable cutting insert 14, which is installed on and engages tool shank 12. In the illustrated embodiment, the rotary cutting tool 10 comprises a modular drill, which in the preferred embodiments is of the so-called twist drill type, having helical flutes disposed along the sides of the drill.

Figure 1:
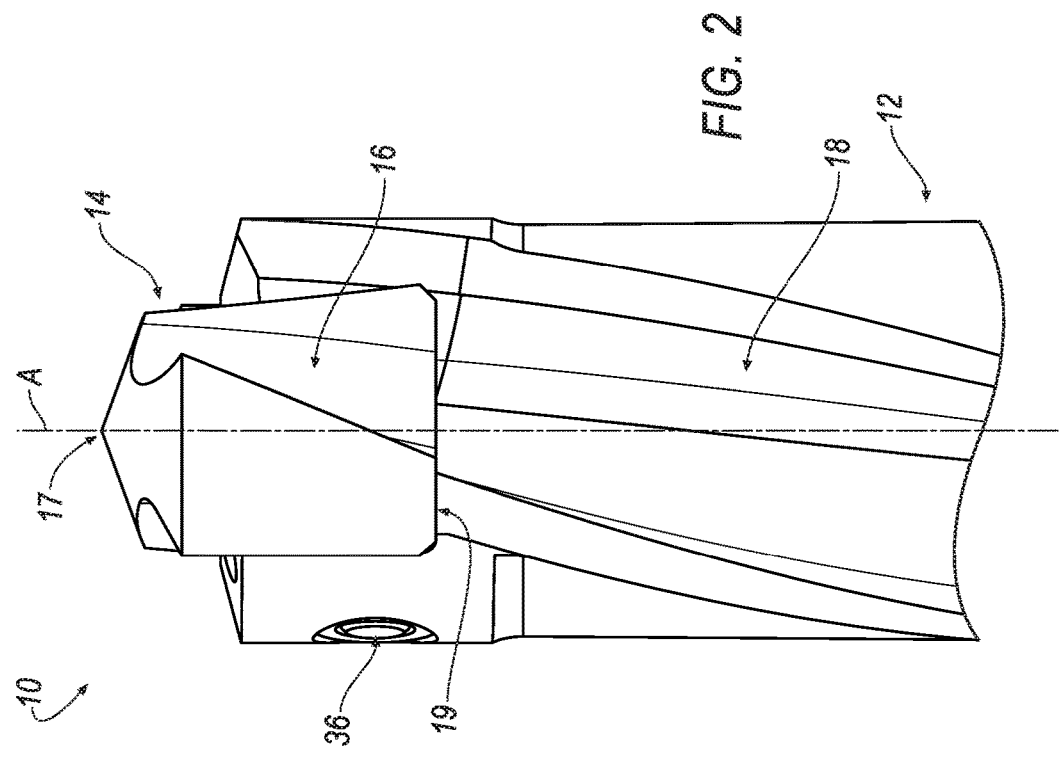
FIG. 1 shows a side elevational view of a rotary cutting tool, such as a modular drill, that includes a shank and an interchangeable cutting insert according to an embodiment of the invention.

In the embodiment of FIG. 1, two flutes are provided in diametric opposition to one another, only one flute being visible. The visible flute has a lateral recess forming part of a flute, or cutting insert flute 16 formed in cutting insert 14. A corresponding or complementing lateral recess or shank flute 18 is formed in the shank 12. Generally, a central longitudinal axis, A, is defined through the cutting tool 10 (common to both the shank 12 and the cutting insert 14), about which the cutting tool 10 rotates during operation. A "cutting insert" may alternatively be referred to, herein and elsewhere, with any of a variety of other suitable terms such as "tip", "insert", "head", "cutting tip" or "cutting insert".

It should be noted that each flute 16, as shown in FIG. 1, includes portions that are disposed in both the shank 12 and the cutting insert 14. Thus, once cutting insert 14 is installed on shank 12, corresponding flutes 16, 18 in the cutting insert 14 and shank 12, respectively, will align to form flutes that are generally continuous. Although two flutes 16, 18 are depicted herein, it should be understood that any number of flutes (including only one) is possible.

Figure 2:
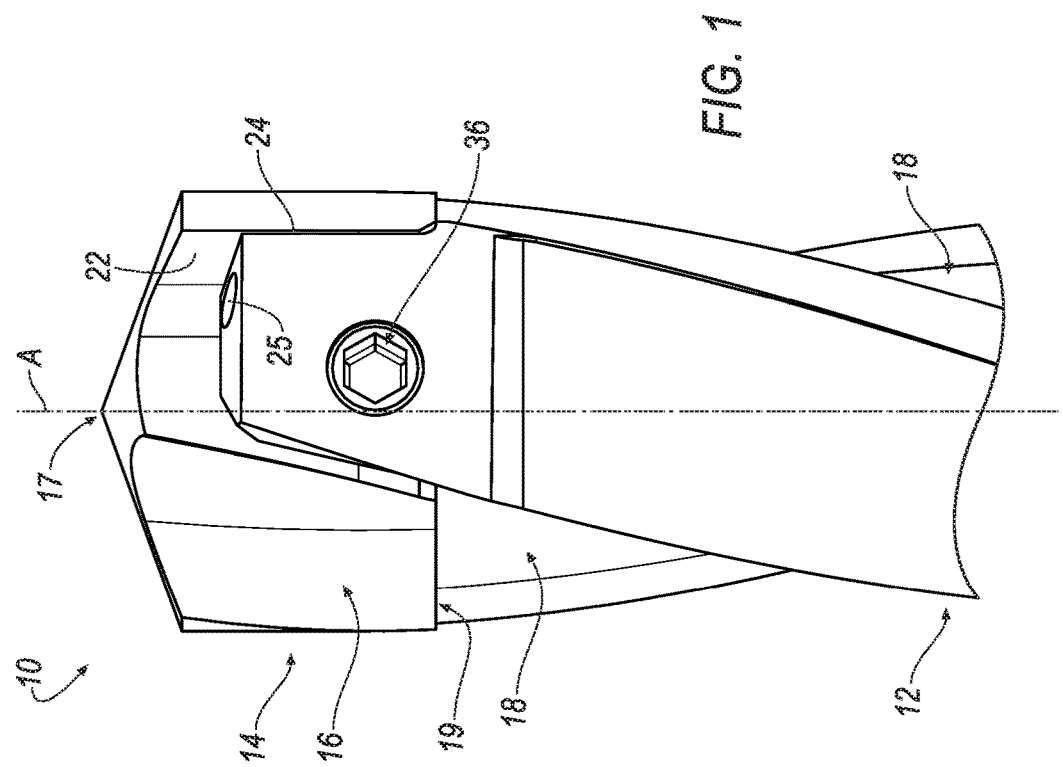
FIG. 2 shows another side elevational view of the modular drill of FIG. 1.

FIGS. 1 and 2 provide an elevational view of the shank 12 and the cutting insert 14 in the cutting tool 10, in accordance with at least one embodiment. As shown, the cutting insert 14 is fixedly positioned at an axial end of the shank 12, in preparation for operation. Further details of a shank and cutting insert in accordance with at least one embodiment will be better appreciated from the ensuing discussion.

In the depiction of FIGS. 1 and 2, the cutting insert 14 emerges at a leading end 17 of the cutting tool 10. A "leading end", defined herein for semantic purposes, represents that end which engages a workpiece when cutting. During cutting operations, cutting tool 10 is rotated, and advanced progressively into a workpiece as cutting progresses. That end of cutting insert 14 located oppositely to the leading end 17 can be referred to as the trailing end 19. The terms "leading end" and "trailing end" are semantic devices which apply equally to the shank 12 and the cutting insert 14 as they connote directional orientation with respect to longitudinal axis, A, rather than specific structure. The leading end 17 is that which penetrates a workpiece (not shown), and the trailing end 19 is that end opposed to the leading end 17.

Figure 3:
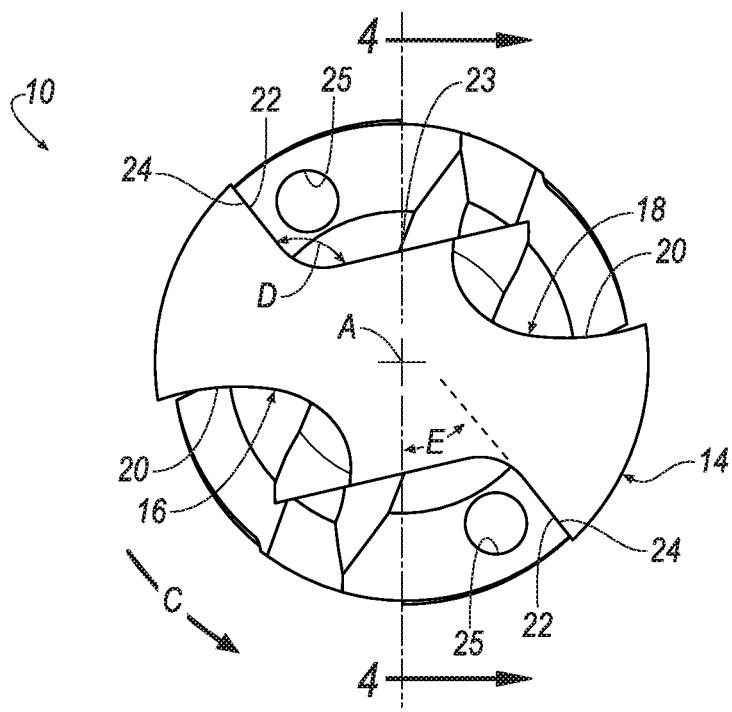
FIG. 3 shows a top view of the modular drill of FIG. 1.

FIG. 3 provides a top view of the shank 12 and the cutting insert 14 installed therein, in accordance with at least one embodiment. As shown, the insert 14 is front-loaded at an axial end of the shank 12, for engaging in a cutting operation when the cutting tool 10 is rotated about longitudinal axis, A, in a counter-clockwise cutting direction, C (when viewed with respect to FIG. 3). The cutting insert 14 is received in a pocket 28 (FIG. 4) of the shank 12. In the illustrated embodiment, the cutting insert 14 includes a pair of cutting edges 20, each disposed adjacent to a respective flute 16 of the cutting insert 14. As can be appreciated, the cutting edges 20 will cut into a workpiece (not shown) as the drill 10 is rotated in cutting direction, C, when engaging a workpiece. For the purpose of rotatably driving the cutting insert 14, the cutting insert 14 includes two drive surfaces 22 that are dimensioned and disposed in a manner to be engaged by compatible torque transmission walls 24 of the shank 12. The drive surfaces 22 and torque transmission walls 24 are usually each oriented along a plane that is essentially parallel with respect to longitudinal axis, A. Though not explicitly illustrated here, rotation of the entire cutting tool 10 can be actuated via a separate driving element, such as a hand drill, drill press or machine tool, which causes rotation of the shank 12.

As shown in FIG. 3, the cutting insert 14 includes two drive surfaces 22 that are oriented to be compatible with the torque transmission walls 24 of the shank 12. It has been found that this torque transmission force can produce significant stresses in critical regions of the shank 12 due to bending and shear, thus representing a significant place for improvement. For centering and stability, an interference fit arrangement is provided between the cutting insert 14 and the centering walls 32 of the pocket 28. It can be appreciated that elastic deformation of the centering walls 32 may create stresses in the same areas as stresses caused by torque transmission when in operation. Preferably, when viewed transversely with respect to axis, A, surfaces/walls 22 and 24 can be oriented such that a driving force is transmitted generally in a tangential, not radial, direction with respect to axis, A. As such, surfaces/walls 22 and 24 can be oriented at an angle, D, with respect to centering walls 32 of the shank 12, and thus to a corresponding surface or centering wall 23 of the cutting insert 14. By way of illustrative example, angle, D, could be between about 75 and about 120 degrees, or preferably between about 85 and about 100 degrees; most preferably, angle, D, can be approximately 90 degrees. It should be appreciated, in this vein, that a workable balance can preferably be found in choosing angle, D, in that larger angles will tend reduce to stresses on insert 14 and increase stresses on the pocket (defined via centering walls of the shank 12), while smaller angles will tend to reduce stresses on the pocket (of the shank 12) and increase stresses on the cutting insert 14.

Figure 6:
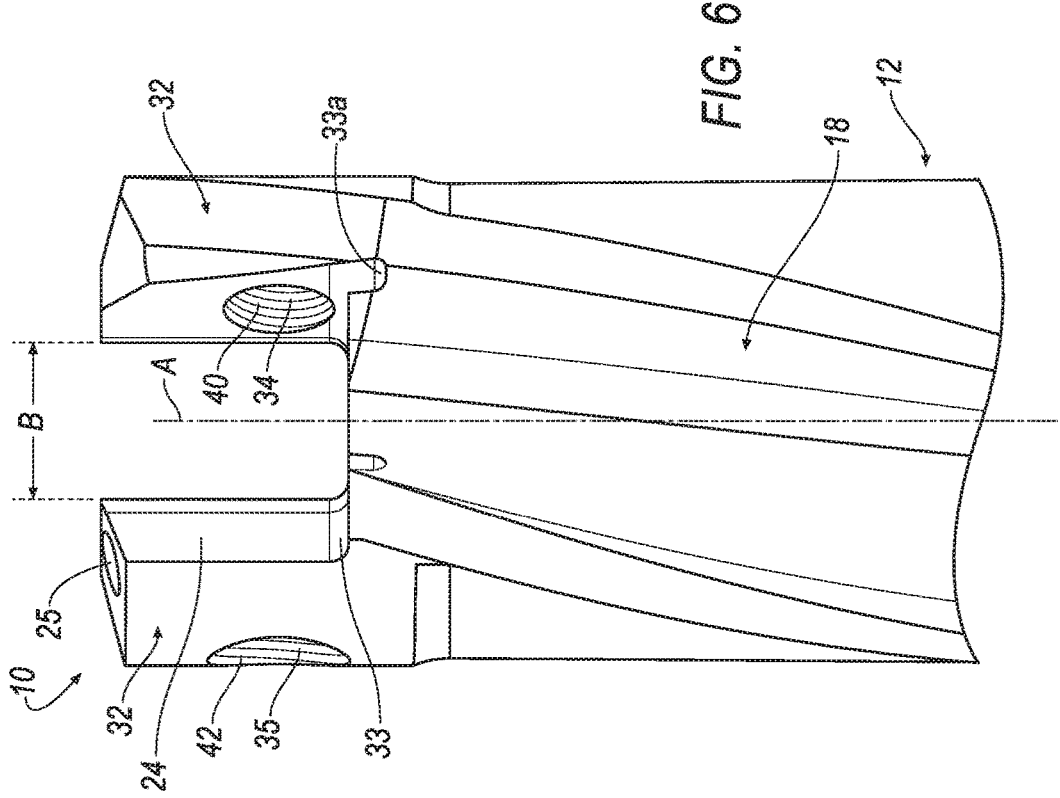
FIG. 6 shows another side elevational view of the shank of the modular drill of FIG. 1.
Figure 5:
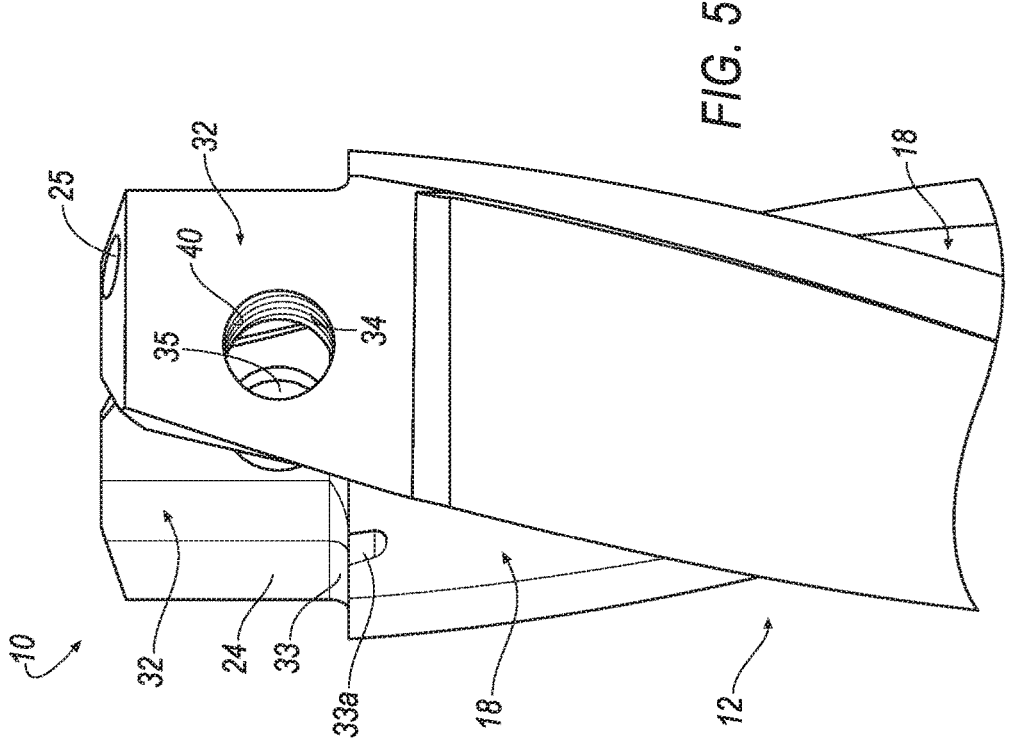
FIG. 5 shows a side elevational view of the shank of the modular drill of FIG. 1.

Generally stated, in accordance with at least one embodiment, the torque transmission walls 24 (and preferably the drive surfaces 22, when the cutting insert 14 is mounted in the shank 12) can each be oriented at a predetermined angle (e.g., angle D) with respect to a defining dimension of at least one centering wall portion of shank 12 (which may be analogous to one or more centering walls, such as those indicated at 32 in FIGS. 5 and 6). If the at least one centering wall portion is substantially straight when viewed in a given, single horizontal plane that is transverse to axis A, the defining dimension can be understood as a dimension in parallel with respect to the at least one centering wall portion. If, in accordance with at least one variant embodiment as described further above, the at least one centering wall portion is curved when viewed in a given, single horizontal plane that is transverse to the axis A (and, e.g., along an arc that is substantially parallel to a circumference of the greater shank 12), then the defining dimension can be understood as a tangent of the curvature of the at least one centering wall portion at a midpoint of the at least one centering wall portion.

In addition, the torque transmission walls 24 (and preferably the drive surfaces 22) can each be oriented at a predetermined angle (e.g., angle E) with respect to the apertures 34, 35 (and preferably the differential clamping screw 36, and the central, longitudinal axis, F, of the cutout opening 48), as shown in FIG. 3. In the illustrated embodiment, the angle, E, is about 40 degrees. However, it will be appreciated that the invention can be practiced with an angle, E, in the range between about 0 degrees (i.e. substantially parallel to the clamping screw 36) and about 40 degrees, as shown in FIG. 3. The angle, E, between the torque transmission walls 24 (and preferably the drive surfaces 22 of the cutting insert 14) and the clamping screw 36 (and the axis, F, of the opening 48 of the cutting insert 14) helps to prevent excessive stresses on the screw 36 that may result in opening of the pocket 28.

Figure 7:
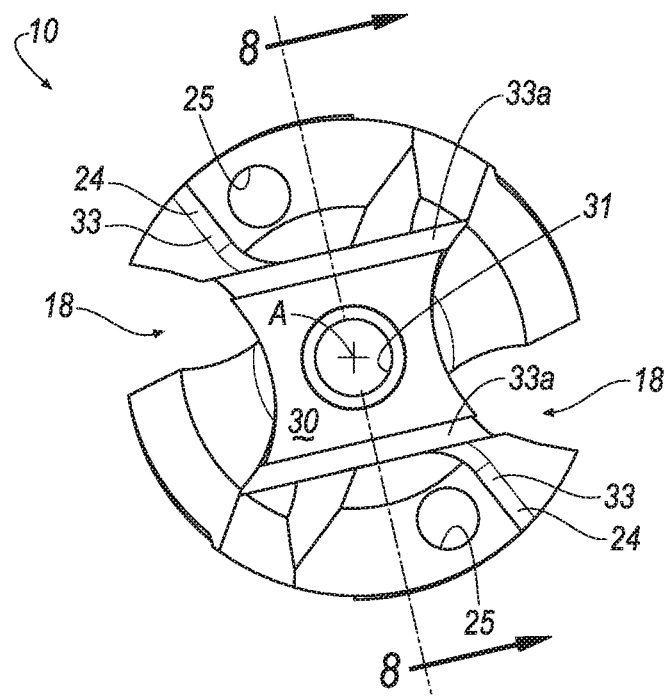
FIG. 7 shows a top view of the shank of the modular drill of FIG. 1.
Figure 8:
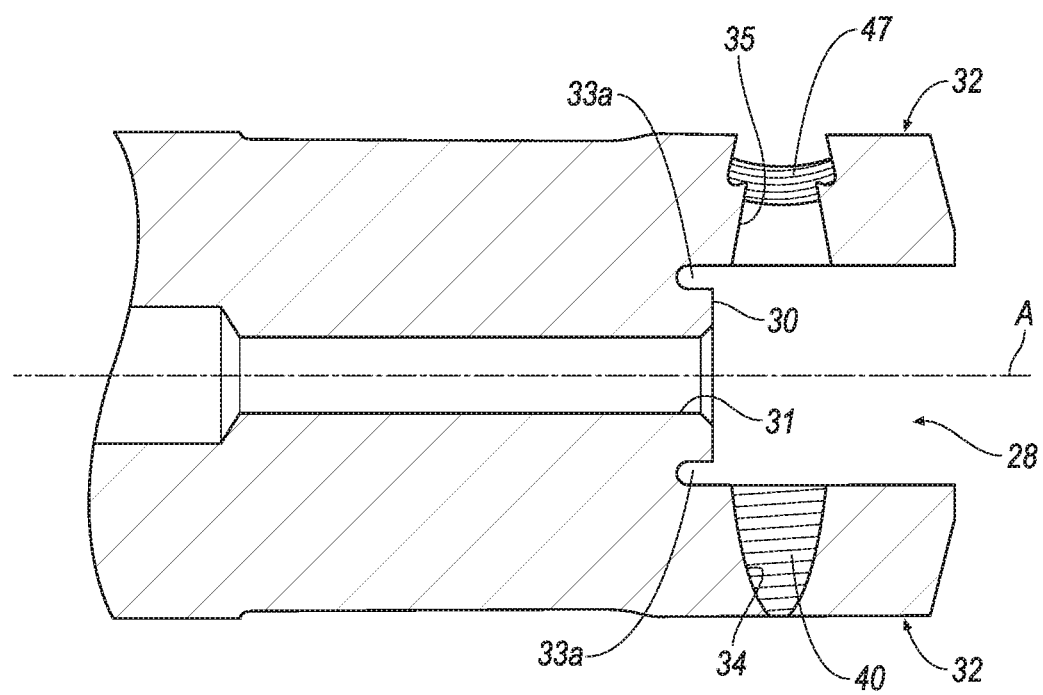
FIG. 8 shows a cross-sectional view of the shank taken along line 8-8 of FIG. 7.

Referring now to FIGS. 5-10, the shank 12 is shown according to an embodiment of the invention. In the illustrated embodiment, the shank 12 includes a pair of flutes 18 that are configured to interface with compatible flutes 16 of the cutting insert 14. However, it will be appreciated that the invention is not limited by the number of flutes, and that the invention can be practiced with any desirable number of flutes, depending on the dimensions of the drill. The shank 12 includes a pocket 28 for accommodating a cutting insert; the principal elements of the latter include two centering walls 32 interconnected by a central floor portion 30. The central floor portion 30 is oriented substantially transverse with respect to central longitudinal axis, A. Any or all the central floor portion 30 and the centering walls 32 serve as abutment surfaces that contact the cutting insert 14 when the cutting insert 14 is installed on the shank 12. The floor portion 30 includes a substantially circular opening 31 that is generally concentric with the central axis, A. Shallow, semi-circular undercuts 33a may be provided between the floor portion 30 and the centering walls 32 to increase the flexibility of the centering walls 32, as shown in FIGS. 7 and 8.

Figure 9:
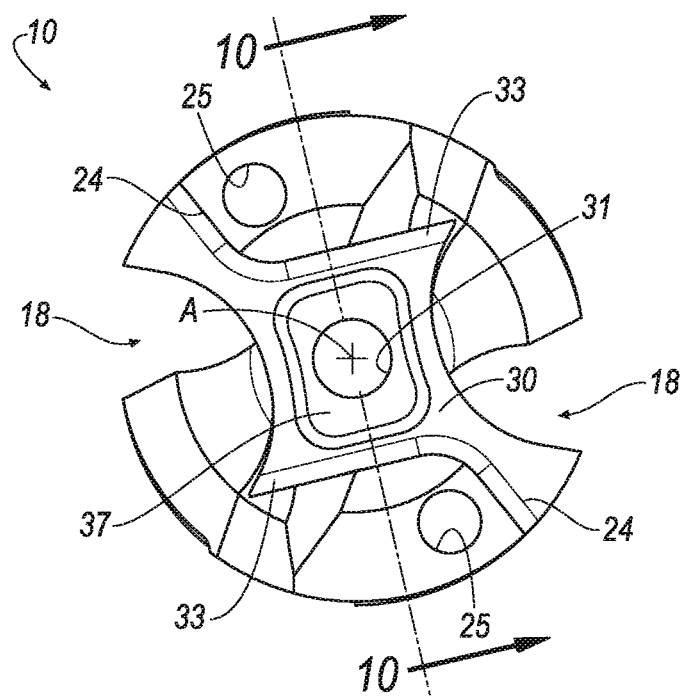
FIG. 9 shows a top view of a shank of the modular drill according to another embodiment of the invention.
Figure 10:
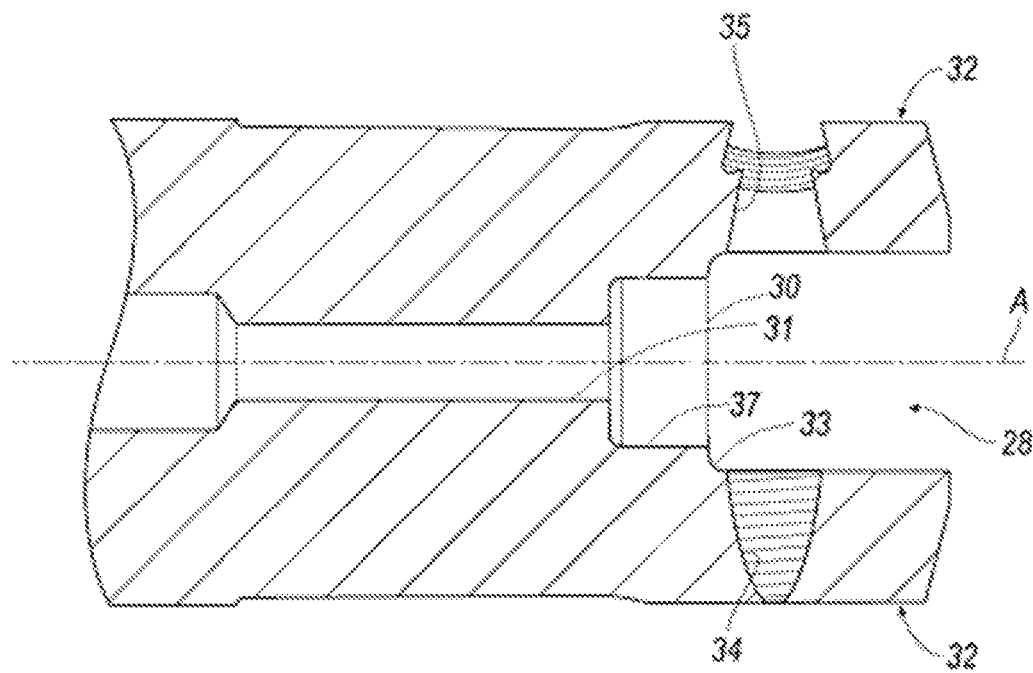
FIG. 10 shows a cross-sectional view of the shank taken along line 10-10 of FIG. 9.

In an alternate embodiment shown in FIGS. 9 and 10, the floor portion 30 may include a cavity 37 to increase the flexibility (and the elastic deformation) of the centering walls 32 in the direction of the central, longitudinal axis of clamping screw 36. In addition, shallow, semi-circular radius blends 33 are provided between the floor portion 30 and the centering walls 32 to reduce stresses in the corners between the pocket floor 30 and centering walls 32 and the torque transmission walls 24. In the illustrated embodiment, the cavity 37 has a non-circular cross-sectional shape, for example, oblong, and the like. However, it will be appreciated that the cavity 37 can have any desirable cross-sectional shape to increase the flexibility of the centering walls 32.

In a manner to be appreciated more fully below, the centering walls 32 elastically deform to receive compatible portions of a cutting insert 14. Preferably, the centering walls 32 (or at least a portion thereof) are substantially parallel with respect to the central longitudinal axis, A. In another embodiment, the centering walls 32 may be inclined away from axis, A, in progressing toward a leading end of the shank 12. In accordance with at least one embodiment, as shown in FIG. 6, the centering walls 32 are substantially straight and parallel to one another when viewed in a given, single horizontal plane that is transverse to axis, A.

In accordance with at least one variant embodiment, the centering walls 32 may each be curved when viewed in a given, single horizontal plane that is transverse to axis, A. In such variants, merely by way of illustrative and non-restrictive example, each wall 32 may be oriented along an arc that is substantially parallel to a circumference of the greater shank 12. Accordingly, taken together, such centering walls 32 would trace a generally frustoconical shape, narrowing as a function of proximity (in an axial direction) to the pocket floor portion 30. The centering walls 32 can have other shapes, such as cylindrical, convex, and the like.

Further advantages may be found in connection with insertion of a cutting insert into pocket 28. Here, to the extent that centering walls 32 end up deflecting radially outwardly with respect to the axis, A, such deflection may be transmitted to the torque transmission walls 24. However, in so doing, the torque transmission walls 24 will deflect virtually in parallel to a radial direction with respect to axis, A, or very close thereto, essentially along their own horizontal dimension (that is, their dimension that is transverse to the axis, A). This helps maintain face-to-face contact with drive surfaces 22 of the cutting insert 14 being clamped.

In the arrangement shown in FIGS. 5-7, the torque transmission walls 24 are oriented in parallel with respect to the central longitudinal axis A, when viewed in a generally longitudinal direction. In at least one variant embodiment, the torque transmission walls 24 may be inclined with respect to the central longitudinal axis, A (e.g. at an angle of between about 0 and about 10 degrees, preferably between about 2 and about 6 degrees, and/or may match the inclination of centering walls 32), in a direction opposite to the rotational cutting direction, C, of the shank 12, toward the leading end of the shank 12). (Here, it can be understood that in such a variant the torque transmission walls 24 would, by extension, also be inclined with respect a plane transverse to the central longitudinal axis.) In addition, the radius blends 33 run along between each of the torque transmission walls 24 of the centering walls 32 and the pocket floor 30 to reduce the stresses applied to the pocket 28 and to the cutting insert 14.

Generally, it can be appreciated regarding various embodiments herein that the cutting insert 14, when fully clamped in the shank 12, may contact the pocket floor 30, or there may indeed be a small gap between a bottom portion of a main head portion of the insert 14 and the pocket floor 30. Accordingly, while various views herein may not explicitly illustrate such a gap (e.g., for general ease of illustration), it should be understood and appreciated that such a gap can be present in accordance with one or more embodiments and/or variants.

FIGS. 5 and 6 show an elevational view of the shank 12. As shown, the centering walls 32 can be substantially symmetrical with respect to axis, A, and may be inclined at a mutual angle, B, with respect to one another. The angle, B, could represent an angle of between about 0 and about 6 degrees. In the illustrated embodiment, the angle, B, is approximately 0 degrees. However, it should be understood and appreciated that, when being installed, the centering walls 32 will be elastically deformed away from each other to enable the insert to be easily front-loaded into the pocket 28.

Figure 4:
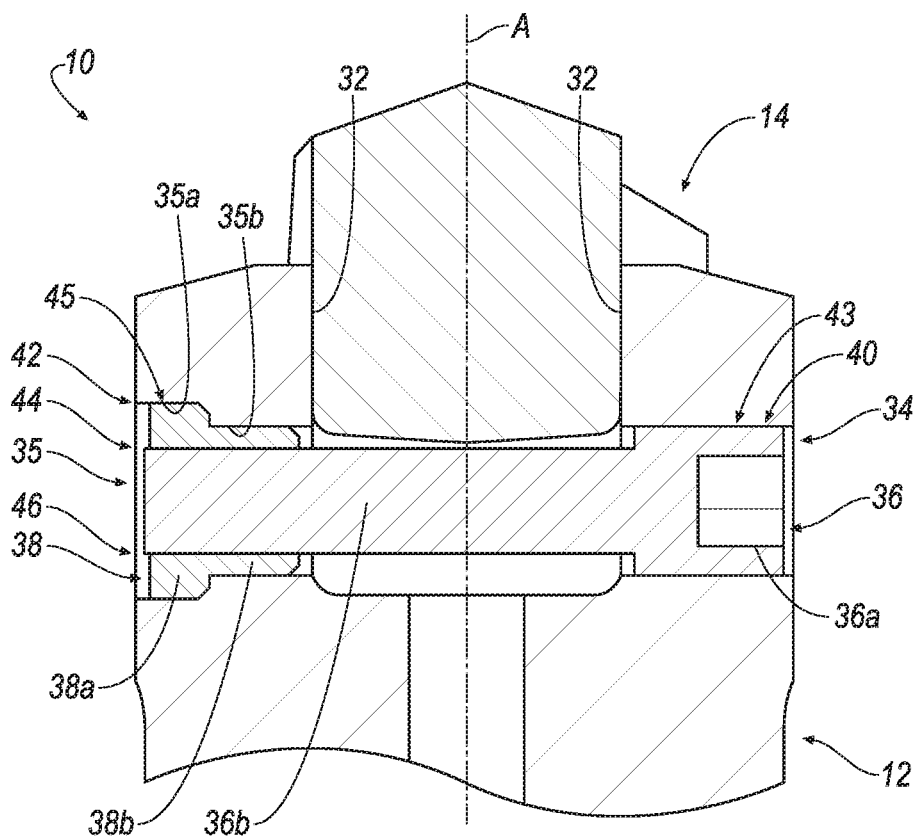
FIG. 4 shows a cross-sectional view of the modular drill taken along line 4-4 of FIG. 3.

As shown in FIGS. 5 and 6, one centering wall 32 includes an aperture 34 extending in a radial direction (i.e. substantially perpendicular to the axis, A) and the other centering wall 32 includes an aperture 35 extending in the radial direction. As shown in FIG. 4, the aperture 34 has internal threads 40 formed with a first pitch, P1, and the aperture 35 has a first portion 35a having internal threads 42 formed with a second pitch, P2, and a second portion 35b with no threads. A first member 36 comprising a differential clamping screw has a head portion 36a with external threads 43 formed with the first pitch, P1, and a shank portion 36b with external threads 44 formed with the second pitch, P2. A second member 38 comprising a nut has a head portion 38a with external threads 45 formed with the second pitch, P2, and a central aperture 38b with internal threads 46 formed with the pitch, P2. In one embodiment, the pitch, P1, is different than the pitch, P2, in a range between about 0.01 mm to about 0.20 mm. It has been found that the differential pitches provide a mechanical advantage with enough force to elastically deform the centering walls 32 of the pocket 28 in a radially outward direction (i.e. away from the axis, A) to easily replace the cutting insert 14. In addition, the different pitches provide an additional clamping force against the cutting insert 14 to securely hold the cutting insert 14 in the pocket 28. The internal threads 46 of the nut 38 have the same pitch, P2, as the external threads 45 of the nut 38 to allow easily installation of the clamping screw 36 and the nut 38.

In one embodiment, the clamping screw 36 causes the centering walls 32 to elastically deform and move radially outward when the clamping screw 36 is rotated in a counterclockwise direction until cutting insert 14 can be manually inserted between the centering walls 32. At this point, the clamping screw 36 is under compressive load. The clamping screw 36 is then returned to the "0" position by rotating the clamping screw 36 in an opposite, clockwise direction, thereby relaxing the centering walls 32, which will then contact the walls 22, 23 of the cutting insert 14. In the relaxed state or "0" position, the pocket 28 has a smaller width than the corresponding dimension on the cutting insert 14, when measured perpendicular to the axis, A, thereby forming an interference fit arrangement between the centering walls 32 and the cutting insert 14. At this point, the clamping screw 36 is not subject to any load. Additional rotation of the clamping screw 36 in the clockwise direction causes the centering walls 32 to apply additional clamping force against the cutting insert 14, thereby securely holding the cutting insert 14 in the pocket 28. At this time, the clamping screw 36 is subjected to tensile load. This arrangement produces a high clamping force between the centering walls 32 and the cutting insert 14. The clamping force comes in part from the elastic deformation of the centering walls 32 and from the additional force generated by the clamping screw 36. This arrangement is beneficial for the clamping screw 36, as compared to traditional designs in which the width of the pocket walls is larger than the corresponding dimension on the cutting insert in the relaxed state. This is because in conventional designs, the clamping screw needs to generate a force to close any pre-existing gaps between the cutting insert and the pocket walls and to generate additional clamping force to retain the cutting insert, thereby subjecting the clamping screw to high tensile loads and breakage during operation.

Figure 11:
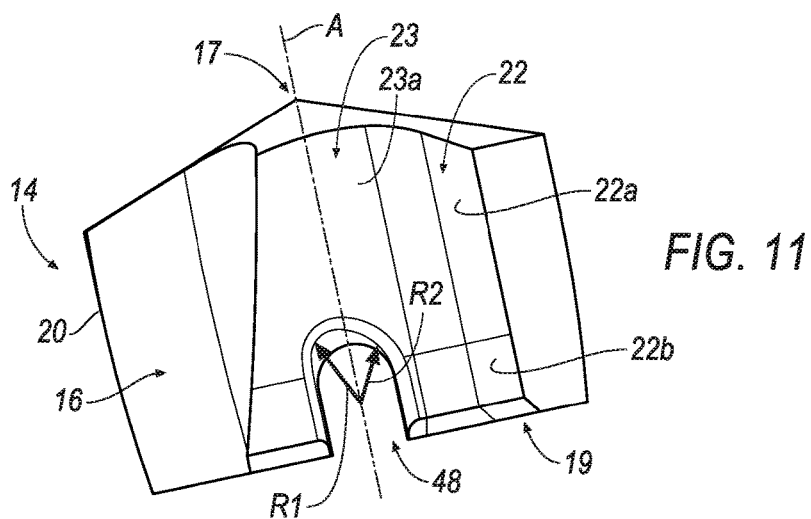
FIG. 11 shows a side elevational view of the cutting insert of the modular drill of FIG. 1.
Figure 12:
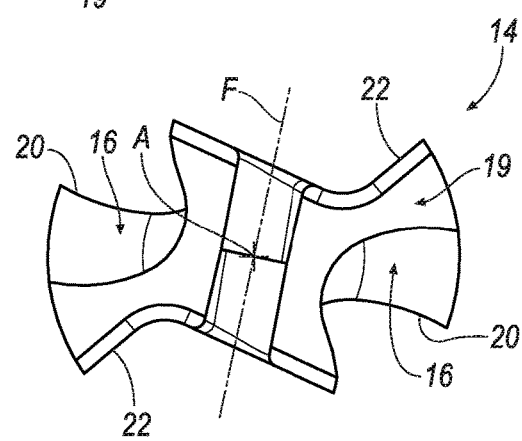
FIG. 12 shows a bottom view of the cutting insert of the modular drill of FIG. 1.
Figure 13:
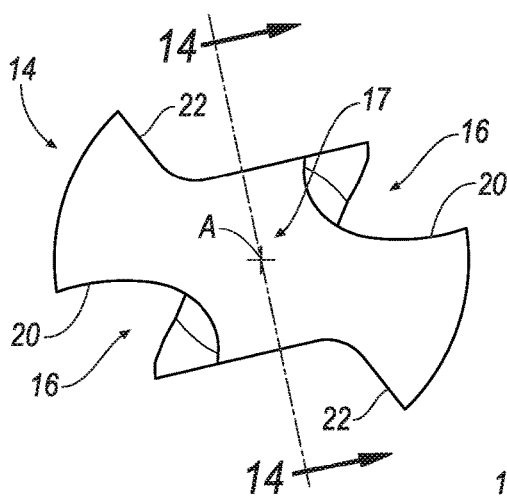
FIG. 13 shows a top view of the cutting insert of the modular drill of FIG. 1.
Figure 14:
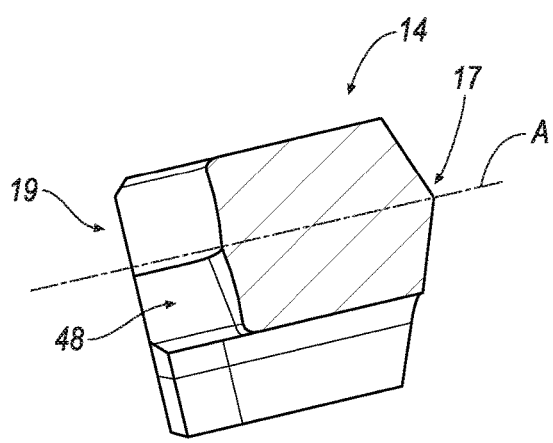
FIG. 14 shows a cross-sectional view of the cutting insert taken along line 14-14 of FIG. 13.

Referring now to FIGS. 11-14, the cutting insert 14 is shown according to an embodiment of the invention. In general, the trailing end 19 of the cutting insert 14 has a cutout opening 48 formed therein. The opening 48 has sufficient dimensions to enable the cutting insert 14 to be assembled to the shank 12, as shown in FIG. 4. In the illustrated embodiment, the opening 48 is formed with at least two different radii, R1, R2, on opposite sides of the rotational axis, A, such that the opening 48 has a curved shape. Specifically, the radius, R2, of the opening 48 closer to the drive surfaces 22 has a relatively larger radius than the radius, R1, of the opening 48 that is further away from the drive surfaces 22. In addition, the opening 48 and the curved surface 48a is axisymmetric with respect to a central, longitudinal axis, F, that is substantially perpendicular to the rotational axis, A. In other words, the relatively smaller radius, R1, that is on the left side of the axis, A, as viewed in FIG. 11, is on the right side of the axis, A, on viewing the opposite side of the cutting insert 14. It should be noted that the opening 48 has a substantially circular cross-section at the axis, A, which gradually becomes more non-circular (or curved) in cross-section moving from the axis, A, to each side of the cutting insert 14. It has been shown that the axisymmetric curved shape of the opening 48 minimizes stresses caused by torsional forces during operation. The surfaces/walls 22, 23 of the cutting insert 14 may also divided into two parts: a contact part 22a, 23a, and a non-contact part 22b, 23b to reduce stress during machining operation. In another embodiment, the non-contact parts 22b, 23b are omitted.

Figure 15:
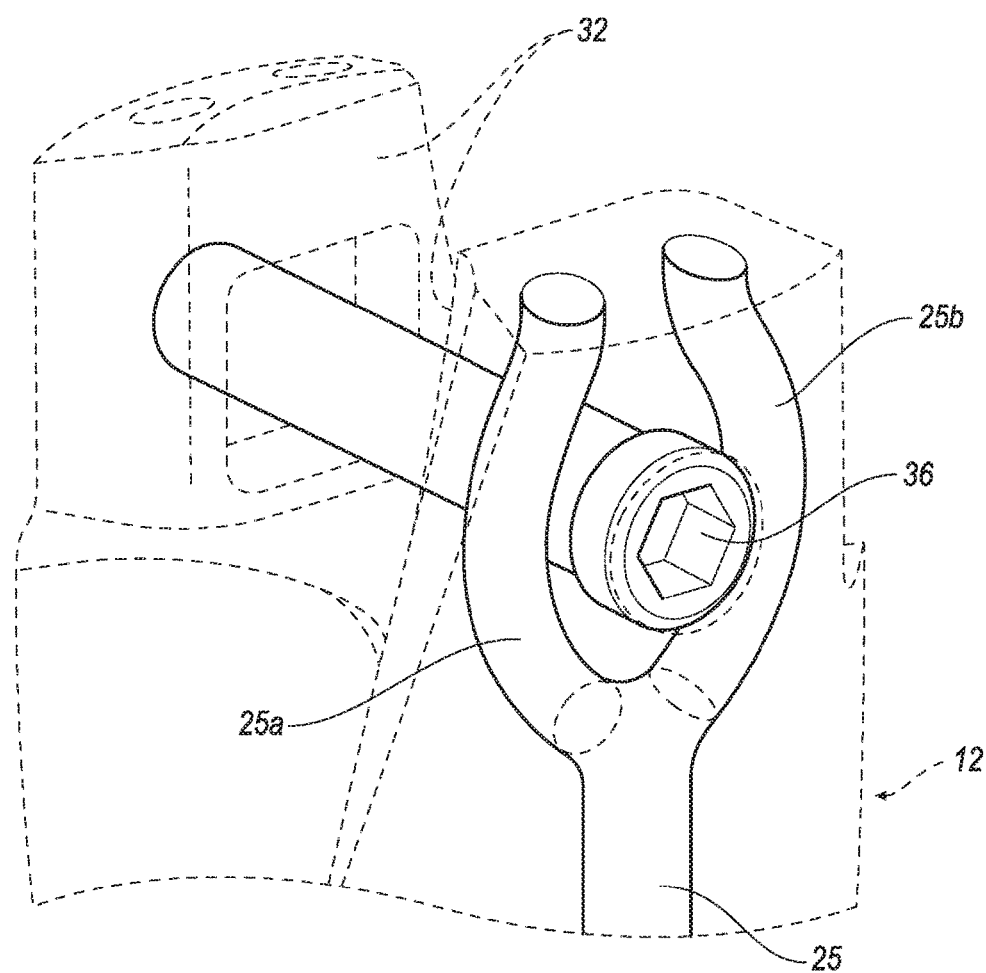
FIG. 15 shows a perspective view of a modular drill with a plurality of coolant holes according to an embodiment of the invention.
Figure 16:
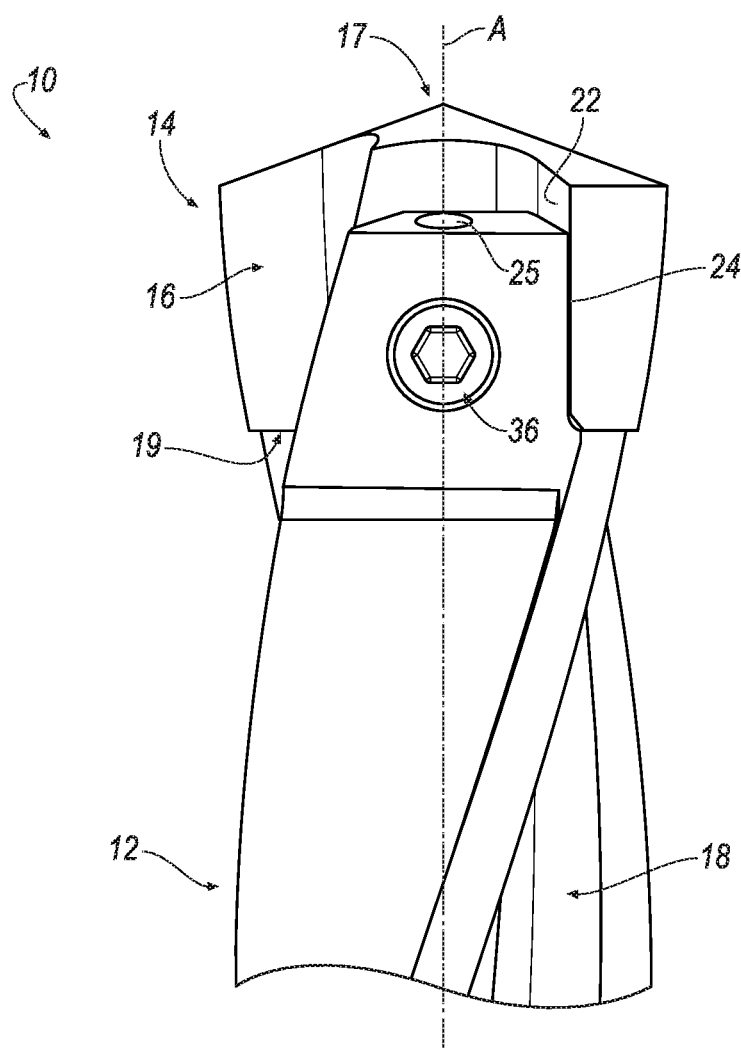
FIG. 16 shows a side elevational view of a modular drill according to an alternate embodiment of the invention.
Figure 17:
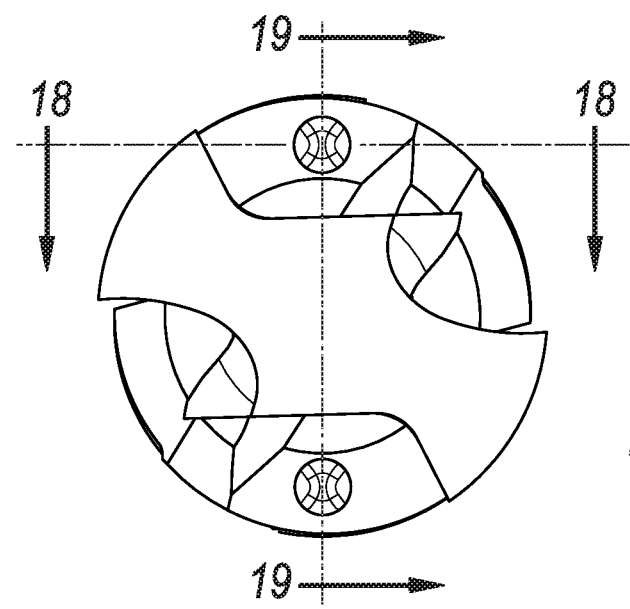
FIG. 17 shows a top view of the modular drill of FIG. 16.
Figure 18:
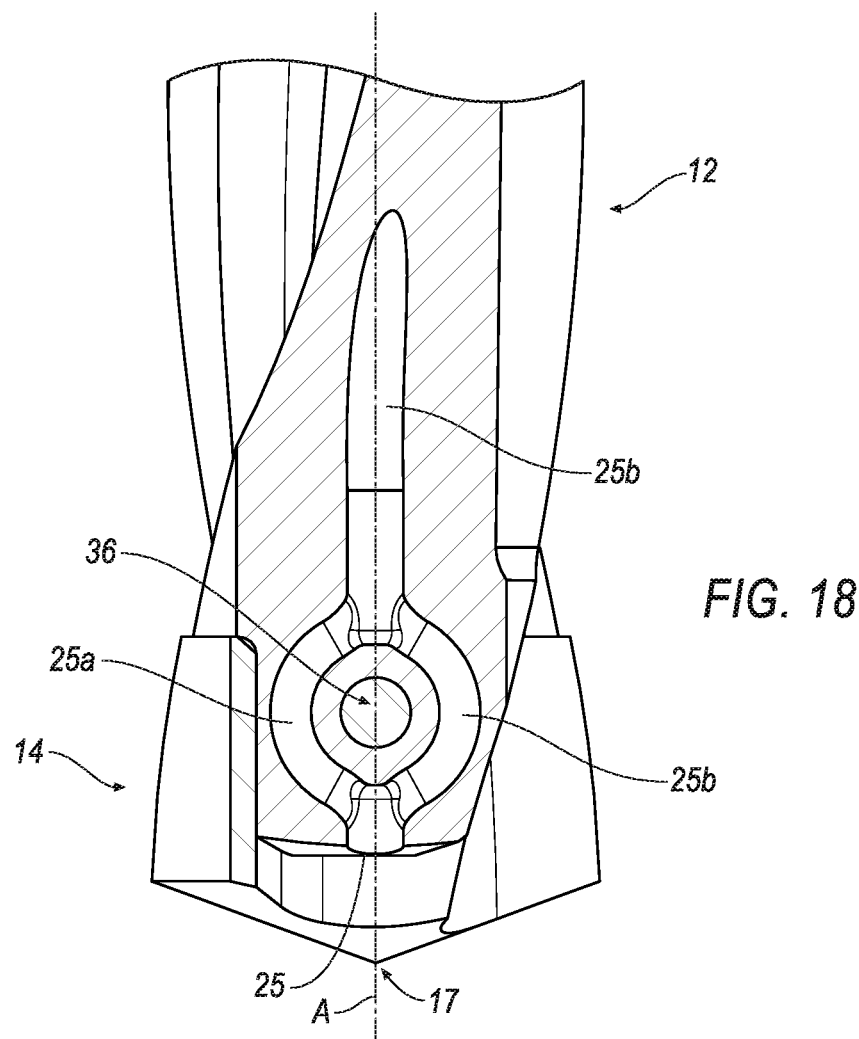
FIG. 18 shows a cross-sectional view of the modular drill taken along line 18-18 of FIG. 17.
Figure 19:
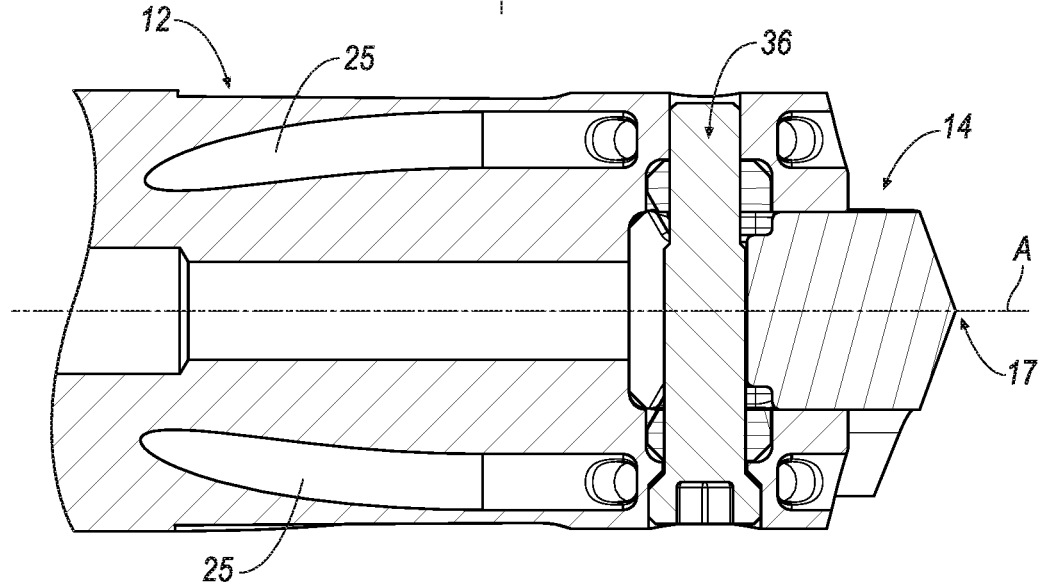
FIG. 19 shows a cross-sectional view of the modular drill taken along line 19-19 of FIG. 17.

In the earlier illustrated embodiments, the shank 12 includes coolant holes 25 that extend through each of the two centering walls 32, as shown in FIGS. 5 and 7. In an embodiment of the invention, the coolant holes 25 can be formed by 3D printing techniques to allow for a larger total cross-sectional area and higher coolant flow. However, it will be appreciated that the invention can be practiced with any desirable number of coolant holes 25, so long as the coolant holes 25 do not intersect with the apertures 34, 35, the clamping screw 36 and the nut 38. This can be accomplished in many ways. One way is to offset the coolant hole 25 with respect to the apertures 34, 35, the clamping screw 36 and the nut 38, as shown in FIG. 1. The main coolant hole 25 can be split into a first coolant hole 25a and a second hole 25b passing through the centering walls 32, as shown in FIG. 15.

Another way is to arrange the coolant hole 25, the apertures 34, 35, the clamping screw 36 and the nut 38 substantially aligned with the central axis, A, and split the main coolant hole 25 into a first coolant hole 25a and a second hole 25b, as shown in FIGS. 16-19. Like the earlier embodiment, the coolant holes 25a, 25b can be formed by 3D printing techniques such that they do not intersect with the clamping screw 36 and leave sufficient distance to the torque transmission walls 24, as measured on a cross section through the pocket floor 30.

It will also be appreciated that the invention is not limited by the combination of a differential clamping screw 36 and threaded nut 38 to provide a mechanical advantage with enough force to elastically deform the centering walls 32 of the pocket 28 in a radially outward direction and a radially inward direction.

Figure 20:
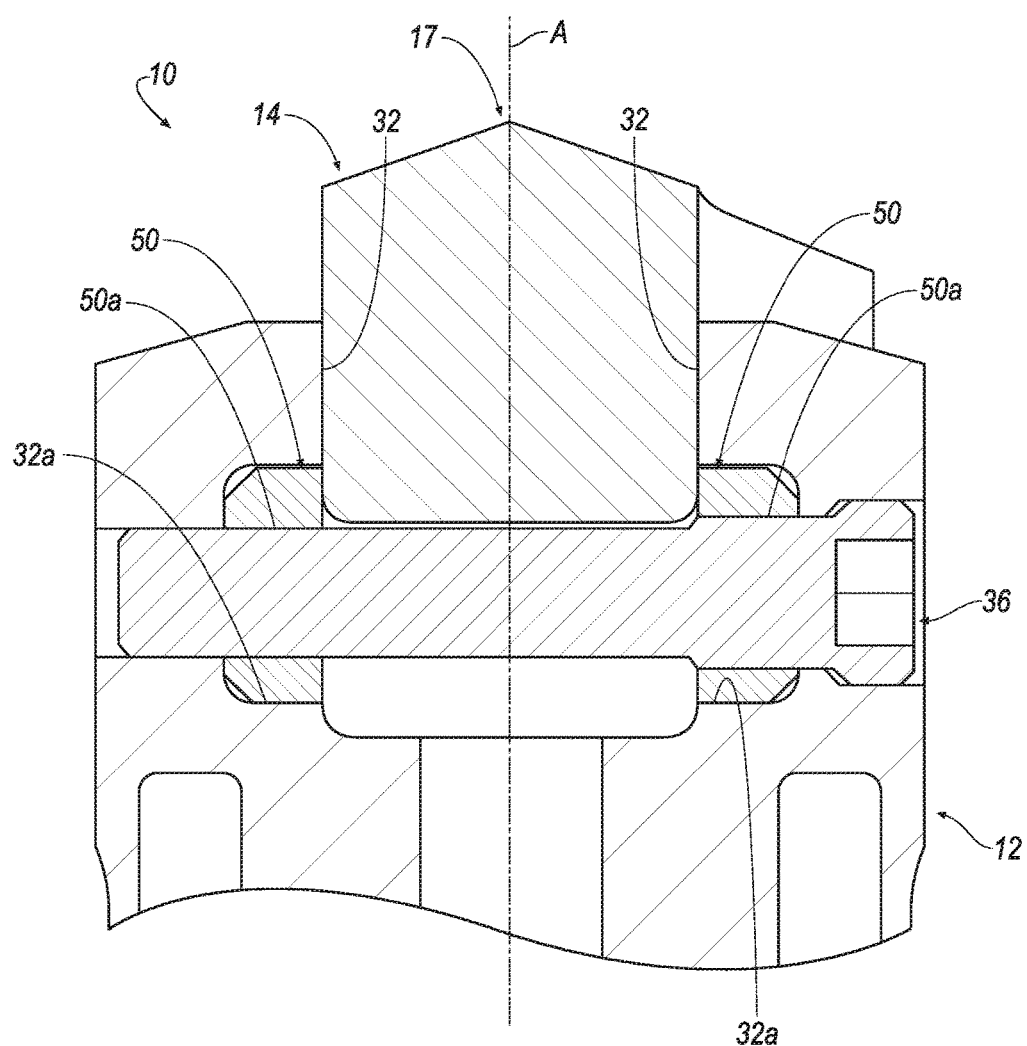
FIG. 20 shows a cross-sectional view of a modular drill with a pair of wedges according to an alternative embodiment of the invention.

FIG. 20 shows another embodiment of the invention in which a pair of wedges 50 are disposed within a cavity 32a of both the centering walls 32 of the pocket 28. The wedges 50 have threaded holes 50a that engage the clamping screw 36 such that the wedges 50 will clamp on the cutting insert 14 when clamping screw 36 is rotated clockwise, and will move radially outward from each other (i.e., away from the axis, A) and abut the wall of each cavity 32a to cause the centering walls 32 to move radially outward (i.e., away the axis, A) when screw is turned in a counterclockwise direction, thereby permitting the cutting insert 14 to be assembled to the shank 12. The wedges 50 may have angled walls (inwardly) that mate with surfaces on the cutting insert 14, thereby creating a clamping action in the axial direction (i.e., in the direction of the axis, A) when the clamping screw i36 s rotated to the clockwise direction. This arrangement also provides an interference fit between the cutting insert 14 and the centering walls 32 so that the clamping force comes from the wedges 50 and from the centering walls 32.

In another embodiment, the wedges 50 are integrally formed with the shank 12, but are flexible and can be elastically deformed when clamping screw 36 is rotated in both the clockwise and counterclockwise directions, thereby operating in a similar fashion as the previously described embodiment.

As described above, the problem of the permanent deformation of the pocket under high torque is solved by providing a side-activated modular drill with a first member, such as a clamping screw, and a second member, such as a nut, wedge, and the like, to create elastic deformation of the pocket walls when removing and clamping the cutting insert in the pocket. In another embodiment, the first and second members may comprise a pair of wedges with internal threads that cause the centering walls to move radially inward or outward when the screw is rotated.

The patents and publications referred to herein are hereby incorporated by reference.

Having described presently preferred embodiments the invention may be otherwise embodied within the scope of the appended claims.

What is claimed is:

1. A front-loaded, side-activated modular drill for conducting rotary cutting operations on a work piece comprising a shank and a replaceable cutting insert, the tool shank and the cutting insert having a common rotational axis and complimentary peripheral surfaces when assembled together;

the shank having a pocket for supporting the cutting insert when the cutting insert is installed within the pocket, the pocket comprising a first centering wall and a second centering wall, the first centering wall having an aperture with internal threads formed with a first pitch, the second centering wall having an aperture with a first portion with internal threads formed with a second, different pitch;

a first member threaded into the aperture of the first centering wall;

a second member threaded into the aperture of the second centering wall of the shank and onto the first member; and a replaceable cutting insert inserted within the pocket of the shank, the cutting insert having a leading end and a trailing end, the trailing end having an opening for allowing the first member to pass therethrough, wherein rotation of the first member in a first direction causes the first centering wall and the second centering wall to move radially outward with respect to the rotational axis, thereby allowing the cutting insert to be removed from the pocket of the shank, and wherein rotation of the first member in a second direction, opposite to the first direction, causes the first centering wall and the second centering wall to move radially inward with respect to the rotational axis, thereby clamping the cutting insert securely in the pocket of the shank.

2. The modular drill according to claim 1, wherein the first member comprises a head portion with external threads formed with the first pitch, and a shank portion with external threads formed with the second pitch.

3. The modular drill according to claim 1, wherein the second member comprises a head portion with external threads formed with the second pitch, and a central aperture with internal threads formed with the second pitch.

4. The modular drill according to claim 1, wherein the first member comprises a differential clamping screw, and wherein the second member comprises a nut.

5. The modular drill according to claim 1, wherein a difference between the first pitch and the second pitch is in a range between about 0.01 mm to about 0.20 mm.

6. The modular drill according to claim 1, wherein the centering walls are substantially symmetrical with respect to the rotational axis, and inclined at a mutual angle, B, between about 0 degrees and about 6 degrees with respect to each other.

7. The modular drill according to claim 1, wherein the opening of the cutting insert is formed with at least two different radii on opposite sides of the rotational axis such that the opening has a curved shape.

8. The modular drill according to claim 1, wherein the cutting insert includes a plurality of drive surfaces that are oriented to be compatible with a plurality of torque transmission walls of the shank.

9. The modular drill according to claim 8, wherein the plurality of drive surfaces are oriented an angle, E, of between about 0 degrees and about 40 degrees with respect to first member when threaded into the aperture of the first centering wall.

10. The modular drill according to claim 1, wherein the two centering walls are interconnected by a central floor portion oriented transversely with respect to the rotational axis.

11. The modular drill according to claim 10, wherein the floor portion has a cavity for increasing a flexibility of the two centering walls.

12. The modular drill according to claim 1, wherein each centering wall has at least one coolant hole extending therethrough.

13. A front-loaded, side-activated modular drill for conducting rotary cutting operations on a work piece comprising a shank and a replaceable cutting insert, the tool shank and the cutting insert having a common rotational axis and complimentary peripheral surfaces when assembled together;
   the shank having a pocket for supporting the cutting insert when the cutting insert is installed within the pocket, the pocket comprising a first centering wall and a second centering wall, the first centering wall having an aperture, the second centering wall having an aperture;
   a second member disposed within the first centering wall of the shank, the second member having an aperture with internal threads formed with a first pitch;
   a first member inserted through the aperture of the first centering wall and threaded into the second member;
   a third member disposed within the second centering wall of the shank, the third member having an aperture with internal threads formed with a second pitch, the first member threaded into the third member and extends through the aperture of the second centering wall; and
   a replaceable cutting insert inserted within the pocket of the shank, the cutting insert having a leading end and a trailing end, the trailing end having an opening for allowing the first member to pass therethrough,
   wherein rotation of the first member in a first direction causes the first centering wall and the second centering wall to move radially outward with respect to the rotational axis, thereby allowing the cutting insert to be removed from the pocket of the shank, and
   wherein rotation of the first member in a second direction, opposite to the first direction, causes the first centering wall and the second centering wall to move radially inward with respect to the rotational axis, thereby clamping the cutting insert securely in the pocket of the shank.

14. The modular drill according to claim 13, wherein the first member comprises a differential clamping screw, and wherein the second member comprises a wedge, and wherein the third member comprises a wedge.

15. The modular drill according to claim 13, wherein a difference between the first pitch and the second pitch is in a range between about 0.01 mm to about 0.20 mm.

16. The modular drill according to claim 13, wherein the centering walls are substantially symmetrical with respect to the rotational axis, and inclined at a mutual angle, B, between about 0 degrees and about 6 degrees with respect to each other.

17. The modular drill according to claim 13, wherein the opening of the cutting insert is formed with at least two different radii on opposite sides of the rotational axis such that the opening has a curved shape.

18. The modular drill according to claim 13, wherein the cutting insert includes a plurality of drive surfaces that are oriented to be compatible with a plurality of torque transmission walls of the shank.

19. The modular drill according to claim 13, wherein the two centering walls are interconnected by a central floor portion oriented transversely with respect to the rotational axis.

20. The modular drill according to claim 13, wherein each centering wall has at least one coolant hole extending therethrough.

21. A replaceable cutting insert having a rotational axis, A, the cutting insert comprising:
   a leading end;
   a trailing end, the trailing end having a cutout opening formed therein;
   wherein the cutout opening is formed with at least two different radii, R1, R2, on opposite sides of the rotational axis such that the opening has a curved shape; and
   a plurality of drive surfaces, wherein the plurality of drive surfaces are oriented at an angle, D, with respect to centering walls of the cutting insert such that a driving force is transmitted generally in a tangential direction with respect to the rotational axis when viewed transversely with respect to the rotational axis.

22. The cutting insert according to claim 21, wherein the angle, D, is between 75 degrees and 120 degrees.

23. The cutting insert according to claim 21, wherein:
   the plurality of drive surfaces are oriented at an angle, E, with respect to a central, longitudinal axis, F, of the cutout opening;
   the central, longitudinal axis of the cutout opening, F, being substantially perpendicular to the rotational axis.

24. The cutting insert according to claim 23, wherein the angle, E, is between 0 degrees and 40 degrees.

25. The cutting insert according to claim 21, wherein the radius, R2, of the opening closer to the plurality of drive surfaces has a relatively larger radius than the radius, R1, of the opening that is further away from the plurality of drive surfaces.

26. The cutting insert according to claim 21, wherein:
   the cutout opening is axisymmetric with respect to a central, longitudinal axis of the cutout opening, F;
   the central, longitudinal axis of the cutout opening, F, being substantially perpendicular to the rotational axis.

* * * * *